Patented Jan. 29, 1935

1,989,133

UNITED STATES PATENT OFFICE 1,989,133

COLORATION OF MATERIALS MADE OF OR CONTAINING ORGANIC DERIVATIVES OF CELLULOSE

George Holland Ellis, Spondon, near Derby, England, assignor to Celanese Corporation of America, a corporation of Delaware No Drawing. Application February 5, 1932, Serial No. 591,235

8 Claims. (Cl. 8—5)

This invention relates to the coloration, by dyeing, printing, stencilling or other methods of artificial filaments, threads, fabrics, films, or other products or materials made of or containing cellulose acetate or other organic derivatives of cellulose.

This application is in part a continuation of my co-pending application No. 98,614 filed March 30, 1926.

I have found that colorations obtained on said materials with the aid of dyestuffs of the anthraquinone series containing an aliphatic acidylamino group in an $\alpha$-position and an amino, alkylamino or substituted alkylamino group in the $\alpha$-position para to the aforesaid $\alpha$-position, in addition to possessing the advantage that they yield the very valuable red to bluish-red or violet colorations on the materials, have an extraordinary fastness far superior to the fastness of such bodies on other materials, such as wool or cotton, and superior also to the colorations produced with the aid of simple aliphatic acidylamino anthraquinones, i. e. bodies which do not possess the amino groups in the 1:4 position, one of which is substituted by an aliphatic acidyl group. For convenience the aliphatic acidyl group will be hereinafter referred to as an "alkacyl" group.

The dyestuffs to be applied in accordance with the present invention have an alkacyl amino group in the 1- position and an amino, alkylamino or substituted alkylamino group in the 4- position. They may contain any other desired substituent groups, such as amino, hydroxy, chlor, methyl and the like, but preferably they should contain no sulpho groups. The aliphatic acid residue substituted on the amino group in the 1- position may be derived from any desired aliphatic acid, for example acetic acid, propionic acid, oxalic acid, succinic acid or the like. The dyestuffs have the general formula

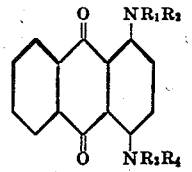

wherein $R_1$ is an aliphatic acidyl group and $R_2$, $R_3$ and $R_4$ are hydrogen, alkyl or substituted alkyl groups. The remaining positions in the anthraquinone nucleus may be substituted or unsubstituted.

The following are examples of suitable dyestuffs which may be applied in accordance with the present invention:—

| Dyestuff | Shade yielded on cellulose acetate |
|---|---|
| 1-acetylamino-4-amino anthraquinone | Red. |
| 1-acetylamino-4-methylamino anthraquinone | Bluish-red. |
| 1-acetylamino-4-hydroxyethylamino anthraquinone | Do. |

$$\text{structure: anthraquinone with NH.CO.CH}_3 \text{ and NH.C}_2\text{H}_4\text{OH}$$

| | |
|---|---|
| 1-propionylamino-4-amino anthraquinone | Red. |

The dyestuffs may be applied to the materials in any suitable manner by dyeing, printing, stencilling or other methods. I prefer to apply them in the unreduced state and in aqueous dispersion, since they are for the most part insoluble in water. They may be reduced to the state of aqueous dispersion (a) by so-called colloidal grinding or milling with or without assistants, (b) by dissolving them in a suitable solvent, such as acetic acid or acetic acid and alcohol, and pouring the resulting solution into an aqueous bath or into water, preferably containing a protective colloid, for example glue, and/or a dispersing agent, and (c) by treating them with suitable dispersing agents so as to effect their dispersion in aqueous media. Such treatment may, for example, involve a pretreatment of the dyestuff with a more or less concentrated dispersing agent and subsequent dilution of the dispersion obtained with the aid of water, preferably containing a small amount of soap or other dispersing agent and preferably hot. Suitable dispersing agents are, for example, those described in Patent No. 1,618,413, and in particular the water soluble salts of higher fatty acids, such as oleic, stearic or palmitic acids, or the sulphonated derivatives of higher fatty acids or their salts, as for example sulphoricinoleic acid or sodium sulphoricinoleate; the carbocyclic dispersing agents of Patent No. 1,618,414, and in particular the naphthenic acids or their salts and sulphonated naphthalene compounds or salts thereof, for example the naphthalene formaldehyde sulphuric acid condensation product or its sodium or ammonium salt; sulphonated aromatic-fatty acid complexes or compounds, for example sulphonated naphthalene oleic acid or sulphonated benzene oleic acid, sulphonated naphthalene ricinoleic acid, sulphonated phenol ricinoleic acid, sulphonated benzene ricinoleic acid, or their alkali or ammonium salts; resin soaps; and other bodies having dispersing properties, such as sulphite cellulose lye.

The dyestuffs may if desired be applied by vatting methods, and in particular by vatting methods which involve the use of minimum amounts of caustic alkali or in which the alkalinity of the vat is suitably reduced, as for example by the methods of Patent No. 1,716,720 (British Patent No. 262,506) involving the addition to the vat of hydroxy or polyhydroxy or simple ring substituted derivatives of hydroxy or polyhydroxy compounds of the isocyclic or heterocyclic organic series, such as benzene, napthalene, anthracene or pyrazol series and the like. Instead of adding the hydroxy or polyhydroxy bodies, for example phenol, cresols, xylenols, catechol, resorcin and the like, to the vat the vat may be made up with the sodium or potassium salts of these compounds.

The dyestuffs of the present invention may be applied to the coloration of materials consisting wholly of cellulose acetate or other organic derivative of cellulose, for example cellulose formate, cellulose propionate, cellulose butyrate, cellulose nitro-acetate, or methyl, ethyl or benzyl cellulose, or to mixed yarns, fabrics or other materials containing such organic derivatives of cellulose in association with other fibres, for example cotton or other yarns or fibres of the cellulosic type, whether natural or artificial, wool, silk and so forth. Differential or uniform shades may be obtained in accordance with the affinity of the dyestuffs for such other fibres as compared with their affinity for the cellulose acetate or other organic derivative of cellulose.

The following examples illustrate the coloration of cellulose acetate goods by the present invention, though they are not to be considered as limiting the invention in any way:—

Example 1

1 lb. of 1-acetylamino-4-amino anthraquinone is ground to a fine powder and added with stirring to 7½ lbs. of 50% neutral Turkey red oil. The whole is heated to 80° C. with stirring, until as homogeneous as possible, and is then diluted to ten gallons with boiling soft water, and poured through a filter cloth into a dyebath containing 300 gallons of soft water. 100 lbs. of cellulose acetate yarn in hank form are now entered, the bath is raised to 75–80° C. in ¾ hour and maintained at this temperature ¾ hour.

The goods, which are now dyed a red or bluish-red shade, are lifted, well rinsed in soft water and dried or otherwise treated as desired.

Example 2

1 lb. of 1-acetylamino-4-hydroxyethylamino anthraquinone is ground to a fine powder and added with stirring to 6 lbs. of 50% aqueous potassium sulphoricinoleate. The whole is heated to 80° C., with stirring, and when as homogeneous as possible it is diluted to ten gallons with boiling soft water, and poured through a filter cloth into a dyebath containing 300 gallons of soft water. 100 lbs. of cellulose acetate yarn in hank form are now entered, the bath is raised to 75–80° C. in ¾ hour, and maintained at this temperature ¾ hour.

The goods, which are now dyed a bluish-red shade, are lifted, well rinsed in soft water, and dried or otherwise treated as desired.

Example 3

1 lb. of 1-acetylamino-4-amino anthraquinone is milled to a fine paste with 9 lbs. of water in a "colloid mill". When as finely reduced as possible the paste so formed is added to a 300 gallon dyebath to which has been added previously a solution of 10 lbs. of glue in water. The liquor is well stirred, and 100 lbs. of cellulose acetate yarn in hank form are now entered. The temperature is raised to 75–80° C. in ¾ hour and maintained at this temperature a further ¾ hour. The goods, which are now dyed the red or bluish-red of Example 1, are lifted, well rinsed in soft water and dried or otherwise treated as desired.

Example 4

1 lb. of 1-acetylamino-4-methylamino anthraquinone is dissolved by boiling in 5 lbs. of glacial acetic acid. The hot solution is now poured with vigorous stirring into 20 gallons of water. This is now added to a 250 gallon dyebath at 50° C., and 100 lbs. of cellulose acetate yarn in hank form are entered. The temperature is raised to 75–80° C. in ½ hour, and dyeing is continued at this temperature for 1 hour.

The goods, which are now dyed a bluish-red, are lifted, rinsed well, and dried or otherwise treated as desired.

What I claim and desire to secure by Letters Patent is:—

1. Process for the coloration of materials comprising organic derivatives of cellulose, comprising applying thereto anthraquinone compounds containing an alkacyl amino group in the 1- position and an amino, alkylamino or substituted alkyl amino group in the 4- position.

2. Process for the coloration of materials comprising organic derivatives of cellulose, comprising applying thereto unsulphonated compounds of the general formula

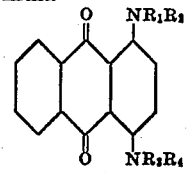

wherein $R_1$ is an aliphatic acidyl group and $R_2$, $R_3$ and $R_4$ are hydrogen, alkyl or substituted alkyl groups.

3. Process for the coloration of materials comprising cellulose acetate, comprising applying thereto anthraquinone compounds containing an alkacyl amino group in the 1- position and an amino, alkylamino or substituted alkyl amino group in the 4- position.

4. Process for the coloration of materials comprising cellulose acetate, comprising applying thereto unsulphonated compounds of the general formula

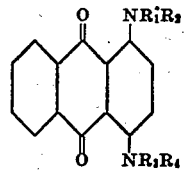

wherein $R_1$ is an aliphatic acidyl group and $R_2$, $R_3$ and $R_4$ are hydrogen, alkyl or substituted alkyl groups.

5. Process for the coloration of materials comprising cellulose acetate, comprising applying thereto an aqueous dispersion of anthraquinone compounds containing an alkacyl amino group in the 1- position and an amino, alkylamino or substituted alkyl amino group in the 4- position.

6. Process for the coloration of materials comprising cellulose acetate, comprising applying thereto an aqueous dispersion of unsulphonated compounds of the general formula

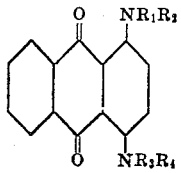

wherein $R_1$ is an aliphatic acidyl group and $R_2$, $R_3$ and $R_4$ are hydrogen, alkyl or substituted alkyl groups.

7. Process for the coloration of materials comprising cellulose acetate, comprising applying thereto 1-acetylamino-4-amino anthraquinone.

8. Process for the coloration of materials comprising cellulose acetate, comprising applying thereto an aqueous dispersion of 1-acetylamino-4-amino anthraquinone.

GEORGE HOLLAND ELLIS.